United States Patent [19]

Lehl et al.

[11] 4,102,272
[45] Jul. 25, 1978

[54] HIGH-SPEED TRANSPORTATION SYSTEM

[76] Inventors: Elvest L. Lehl, 2450 Newell, Wichita, Kans. 67203; Glen W. Zumwalt, 6311 Marjorie La., Wichita, Kans. 67208

[21] Appl. No.: 580,872

[22] Filed: May 27, 1975

[51] Int. Cl.² .................... B60V 3/00; B61B 13/08
[52] U.S. Cl. ................... 104/23 FS; 104/89; 104/138 R; 105/150
[58] Field of Search ........... 104/23 FS, 138 R, 89, 104/118, 121, 155; 105/148, 150; 308/9

[56] References Cited

U.S. PATENT DOCUMENTS

| | | | |
|---|---|---|---|
| 3,006,288 | 10/1961 | Brown | 104/138 R |
| 3,155,050 | 11/1964 | Hafner | 104/138 R |
| 3,238,894 | 3/1966 | Maksim, Jr. | 104/121 |
| 3,373,697 | 3/1968 | Hartje | 104/23 FS |
| 3,377,960 | 4/1968 | Hawes | 104/118 |
| 3,534,689 | 10/1970 | Barthalon | 104/89 |
| 3,543,685 | 12/1970 | Rosciszewski | 104/23 FS |
| 3,675,582 | 7/1972 | Girard et al. | 104/23 FS |
| 3,837,285 | 9/1974 | Goering | 104/138 R |
| 3,919,944 | 11/1975 | Jorg | 104/23 FS |
| 3,938,445 | 2/1976 | Hughes | 104/23 FS |

FOREIGN PATENT DOCUMENTS

854,643  11/1960  United Kingdom .................. 104/89

*Primary Examiner*—Drayton E. Hoffman
*Assistant Examiner*—Carl Rowold
*Attorney, Agent, or Firm*—Robert E. Breidenthal

[57] ABSTRACT

A high-speed transportation system employing a pivotally supported guide rail structure made of sections connected by expansion joints, with a self-propelled airplane automatically steered to fly along the guide rail with minimum force therebetween by a control system that is inclusive of displacement sensors associated with air bearings coupling the aircraft to the guide rail. A wheeled construction having wheels that can be driven, braked or free wheeling is provided that is automatically lowered or maintained in a lowered position contacting the guide rail whenever the aircraft lacks flying speed or the wheels are either driven or braked. The air bearings urge centering of the rail both vertically and laterally with respect thereto. Flight stability of the aircraft is enhanced by the provision of a ground effect bed, and gust spoilers, with the latter additionally functioning as a noise abatement device.

28 Claims, 10 Drawing Figures

HIGH-SPEED TRANSPORTATION SYSTEM

The present invention relates to new and useful improvements in high-speed transportation systems and more paticularly pertains to a self-propelled aerodynamic vehicle operatively associated with guiding construction extending along routes of the system.

The ever increasing densities and areas of population coupled with great needs for rapid movement of people and goods between and within centers of populated areas have created a near critical necessity for immediate development of new and more efficient transportation systems to supplant and even to largely replace a considerable proportion of present systems that are rapidly becoming obsolete and inadequate, especially if effective measures are to be taken to reduce or minimize damage to the ecology or quality of the environment in and about population centers.

Such near critical necessity is enhanced by the need for relieving the present aircraft transportation systems of their burdens at least to the extent that congestion, especially in and about major air terminals, imperils life aboard aircraft as well as life on the ground.

Also, there is great need for a transportation system that can serve with safety the heart of heavy population centers and which can effect departures and arrivals, or stops at any time or route location with minimum susceptibility to ill consequences due to adverse weather conditions.

Numerous proposals have been heretofore made to meet some of the needs and desideratums alluded to above, and a background appreciation of some of such proposals of incidental interest to the present invention can be obtained upon referring to the United States patents listed below:

U.S. Pat. No. 2,976,820 — Schaar — Mar. 28, 1961
U.S. Pat. No. 3,444,823 — Akmentin — May 20, 1969
U.S. Pat. No. 3,527,170 — Witmer — Sept. 8, 1970
U.S. Pat. No. 2,788,749 — Hinsken et al. — Apr. 16, 1957
U.S. Pat. No. 3,534,689 — Barthalon — Oct. 20, 1970
U.S. Pat. No. 1,459,495 — Bennie — June 19, 1923
U.S. Pat. No. 3,238,894 — Maksim, Jr. — Mar. 8, 1966
U.S. Pat. No. 3,233,556 — McDonald — Feb. 8, 1966
U.S. Pat. No. 3,648,620 — Bertin et al. — Mar. 14, 1972
U.S. Pat. No. 3,580,181 — Bertin et al. — May 25, 1971
U.S. Pat. No. 3,515,073 — Faure — June 2, 1970
U.S. Pat. No. 3,412,689 — Hawes — Nov. 26, 1968

The present invention involves several important departures from prior art proposals amongst which may be mentioned the pivotal support or mounting of the guide rail to swing laterally; the inclusion of expansion joints in the guide rail to accommodate variations in length occasioned by changes in temperature or by swinging; the provision of automatically retractable electric trucks by means of which the vehicle is driven and braked, and by means of which the vehicle is supported at least in part when the vehicle lacks flying speed; the provision of coacting pairs of complementary airbearing structures, each of which is in part of coaxial configuration and incorporates displacement sensors that feed the automatic flight computer and control system that automatically causes the aerodynamic vehicle to fly a path tracking the guide; the provision of gust spoilers along the travel path to minimize the effects of lateral wind gusts while aiding in noise abatement; and the provision of a ground effect bed in operative association with the aerodynamic vehicle.

One broad aspect of the invention has to do with an air bearing construction comprising an elongated supporting guide comprised of a pair of elongated parallel and spaced generally cylindrical guide rails joined by a supporting web extending horizontally therebetween, with the junctures of the web therewith subtending angles from the respective centers of such rails less than about 45° above and below the horizontal, a pair of air bearings each comprising a pair of elongated coaxially spaced, inner and outer tubular members, said tubular members having lateral slots extending the entire lengths thereof, said tubular members receiving in coaxially spaced relation therein one of the rails, with the web extending radially through the slots in spaced relation to the tubular members, means sealing the entire periphery of the outer tubular member to the entire periphery of the inner tubular member to confine the space between the tubular members, means for introducing air into the confined space through the outer tubular member, said inner tubular member having spaced perforations therethrough to direct air radially inward from each perforation directly toward the axis of the tubular members, and means connecting the air bearings.

Another broad aspect of the invention involves a transportation system of the type including an elongated guide means, an aerodynamic vehicle, means coupling the vehicle to the guide means for guidance thereby that includes means carried by the vehicle in engagement with the guide means to support the vehicle from the latter; the combination therewith of means carried by the vehicle for moving the support means from supportive engagement when the vehicle has sufficient velocity to support its own weight, whereby energy losses by friction resulting from supportive engagement are avoided.

The invention will be best understood in the light of the following description of preferred embodiments thereof, such description being given in relation to the accompanying drawings illustrative thereof, wherein.

Referring now to the drawings wherein like numerals designate like parts throughout the various views, and directing attention initially to the form of the invention shown in FIG. 1 and 3-10 inclusive, the invention comprises a high-speed transportation system designated generally at 10 that is comprised broadly of an elongated guide means 12 that is dependingly supported at longitudinally spaced positions 14 from arched towers 16 that have ground mounted upstanding and spaced legs 18.

Mounted upon the elongated guide and support means 12 and disposed therebelow is an aerodynamic vehicle 20. The vehicle 20 does not in and of itself constitute such a radical departure from extant aircraft that those conversant with the art will have any difficulty appreciating its aerodynamic character and the aerodynamic controls thereof. Briefly, the aerodynamic vehicle 20 is a self propelled, winged aircraft capable of aerodynamically dirigible flight in free ambient air and comprises a central body portion 22 for passengers and/or cargo, which may be windowed as shown. The body 22 has a windowed forward pilot's compartment 23 from which the pilot has an unobstructed view, though such provision does not preclude the vehicle 20 being remotely controlled. Radar, not shown, can be provided for forward scanning to provide suitable displays for a pilot or remote controller, switch operators, and the like. Though not forming a part of this invention, it will be appreciated by those skilled in the art that the guide means 12 can include structures somewhat analogous to switches, crossings and the like that have been long in use in railroad track systems.

The vehicle 20 is essentially a low wing monoplane and includes oppositely extending left and right wings 24 and 26 that are respectively provided at their forward margins with independently controllable forward flaps 28 and 30. Similarly, the trailing margins of the wings 24 and 26 are respectively provided with independently controllable aft flaps 32 and 34.

Figure 10:
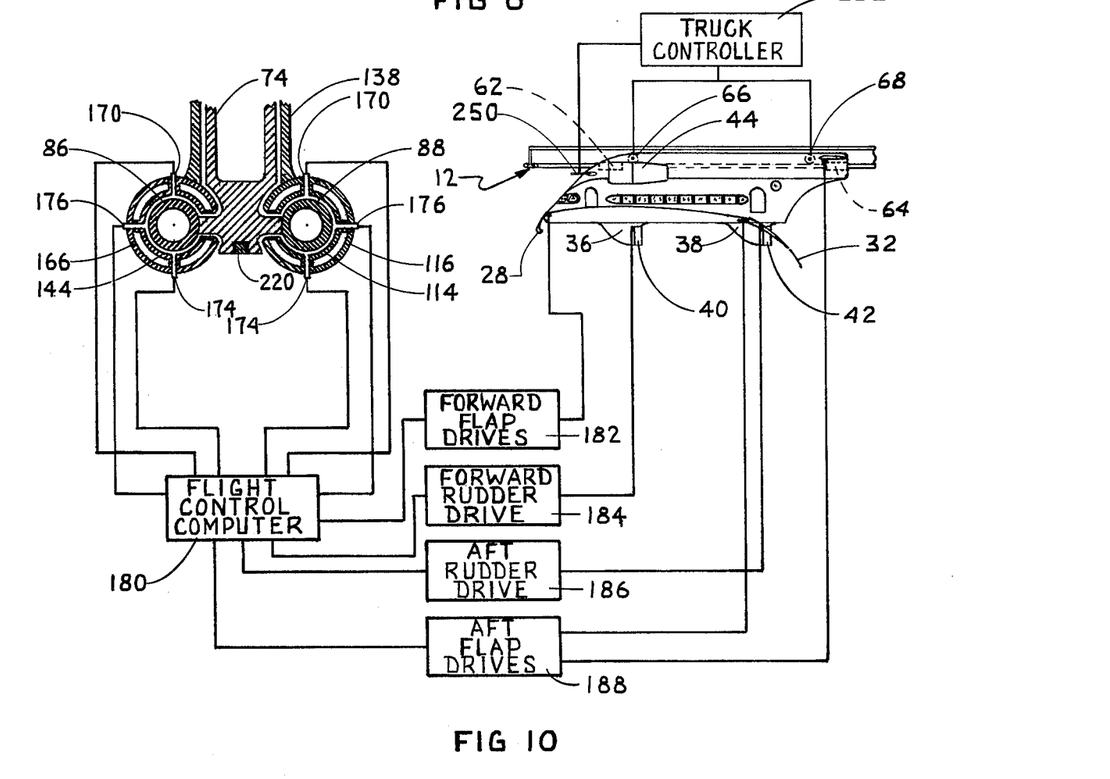

As best shown in FIG. 10, the vehicle has depending vertical fins 36 and 38 that are respectively provided with independently operable forward and aft rudders 40 and 42.

The vehicle 20 is provided with a pair of fan jet engines 44 and 46 closely spaced on opposite sides of the center line of the vehicle 20. As thus far described, the vehicle or aircraft 20 is not only capable of flight in free ambient air, but in addition has such aerodynamic control surfaces as to make the aircraft fully dirigible about its pitch, roll and yaw axes, as well as with respect to lift, drag and side or lateral thrust. As used throughout this specification and in the claims, the expression "aircraft" is intended to mean an airplane or aircraft capable of being fully airborne by dynamic reaction of its wings with free ambient air as is conventional for present day airplanes, and the expression "aerodynamically dirigible" is intended to mean an aircraft steered or directed in all the particulars set forth above.

The disclosed aircraft has an extraordinary degree of dirigibility in that it is capable of tracking during flight an elongated path or guide means while essentially maintaining, without any necessity for load forces between the guide means and the aircraft, two longitudinally spaced portions of the aircraft in an alignment that is tangential to the direction of that part of the guide means immediately adjacent thereto. It is evident that the guide means must be free of abrupt changes in direction and have a radius of curvature in excess of a minimum that is predetermined by the rate at which the aircraft can be aerodynamically caused to change its line of flight.

It is so that the aircraft can be aerodynamically controlled by the interaction of control surfaces with relative wind to track an elongated guide means that the aircraft has both forward and rear rudders, for example, contributes substantially to the ability of the aircraft aerodynamically to track guide means in the presence of a cross wind, all without loading the guide means or of any necessity to 'crab' the aircraft in the jargon of aircraft pilots. Subsequently to be described herein are sets of proximity sensors that are longitudinally spaced substantially so that any significant change of orientation can be readily detected for the requisite promptness and nicety of control for the tracking to be effected. The expressions 'track' and "tracking" are to be construed as to their meanings in the claims in accordance with use of such expressions in this and the last paragraph.

The vehicle 20 can optionally be detachably coupled by any suitable couplers to one or more trailing vehicles such as the vehicles designated at 48, 50 and 52, all in a manner rather similar to the making up of trains, or more accurately, in a manner very similar to the coupling of a series of diesel fueled power units in the railroad art. Such analogy is quite pertinent in that the units or vehicles 20, 48, 50 and 52 are quite similar to each other, are separately self-propelled, separately braking, and separately supported. Along a similar vein, only the first or lead unit need include provision for a pilot, engineer or driver, it being understood that the pilot or engineer of the forward unit exercises parallel control over the operation of the trailing or coupled units in addition to the forward unit.

Accordingly, except as expressly pointed out, it is to be understood that the vehicles 20, 48, 50 and 52 are identical, with identical numerals designating identical corresponding parts, and it will be manifest that control by the pilot of the vehicle 20 (or by any remote operator or controller) is applied essentially in an even handed fashion equally to all of the self-propelled vehicles coupled to make up a train.

Means designated generally at 60 operatively couple the vehicle 20 to the guide means 12, such means 60 including (see FIG. 10) forward and rear air bearing means 62 and 64 respectively, as well as forward and rear electric trucks 66 and 68, respectively. The guide means 12 comprises elongated guide rail structures such as those indicated at 70 and 72 in FIG. 6, such structures being in end to end relationship as shown. Each of such structures 70 and 72 are in transverse section (see FIG. 7) comprised of a pair of spaced vertical plates 74 and 76 that are joined at their upper edges by a plate 78 welded thereto. The plates are joined integrally at their lower margins by a web structure 80 that includes oppositely extending flanges or ribs 82 and 84 which are welded at their extremities to identical and parallel tubular members 86 and 88.

Figure 6:
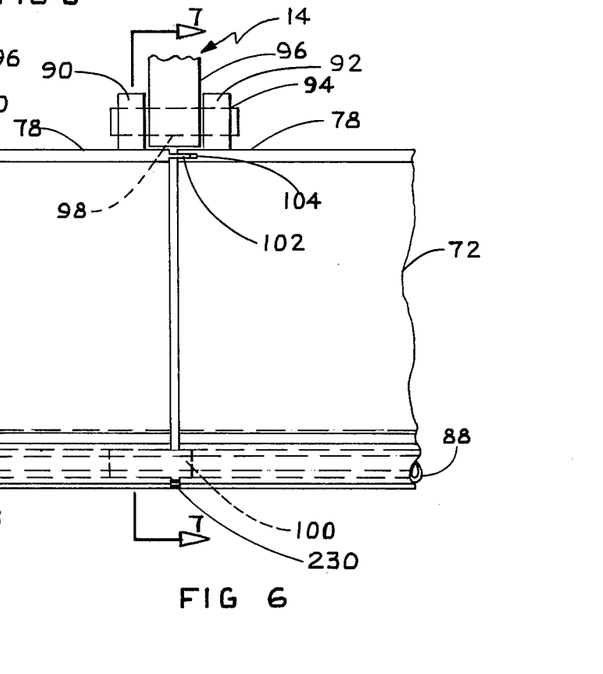
FIG. 6 is an enlarged fragmentary side elevational view of adjoining portions of the guide rail structure, and of their pivotal support with hidden portions being shown in dashed outline.

The means 14 provided to support the guide means 12 is such as to pivotally support adjoining guide means sections 70 and 72 while additionally serving as an expansion joint therebetween as will be appreciated on reference to FIG. 6. The adjacent ends of the sections 70 and 72 are provided with upstanding ears 90 and 92 having aligned openings through which a pivot pin 94 extends. The pivot pin 94 is rotatable in the ears or pillow bearings 90 and 92 and is endwise slidable therethrough to a limited extent whereby the sections 70 and 72 are free to move toward and away from each other. Means, not shown, are provided to prevent inadvertent dislodgment of the pin 94.

The arched tower 16 has a central pendant portion 96 that is received between the ears 90 and 92 in spaced relation thereto and the pin 94 is journaled through an opening 98 provided through such portion 96.

Short cylindrical alignment pins or rods 100 are fixedly secured in the tubular members 86 and 88 in the end of the section 70 adjacent the section 72 so as to slidably extend into the corresponding tubular members of the adjacent end of the section 72. Such arrangement maintains the tubular members or guide rails 86 and 88 of adjoining guide sections in alignment while permitting a modest endwise relative movement of such sections. Further supplementing the alignment function of the pins 94 and 100 are a pair of spaced ribs 102 projecting from the plate 78 of the guide section 70 that are slidingly received in mating grooves 104 in the opposite side edges of the plate 78 of the guide section 72.

Figure 7:
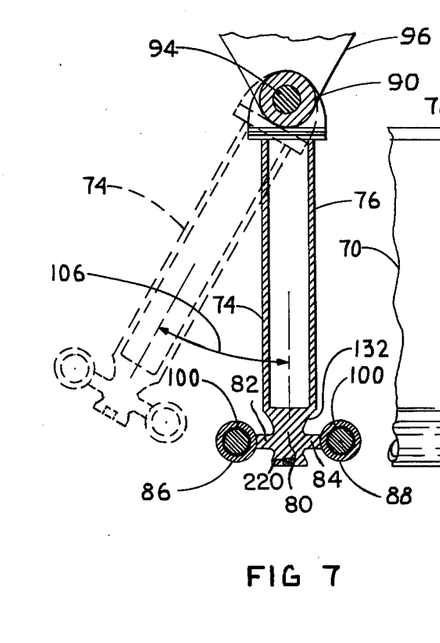
FIG. 7 is a vertical sectional view taken upon the plane of the section line 7—7 in FIG. 6, with an alternate position of the pivoted guide rail being shown in dashed outline.

The guide means 12 is therefore suspended in such a manner that the same can be swung laterally in either direction from its normal vertical position through an angle of at least about 30° such as the arc designated at 106 in FIG. 7; this while maintaining the sections thereof in alignment and while allowing for such expansions and contractions as may occur on changes in temperature as well as for variations in overall length in the guide means 12 that stem from swinging movements of the guide means 12 whether occasioned by lateral forces thereon by the vehicle 20 in negotiating a curve or by side winds. Needless to say the transportation system includes curves (vertical and horizontal) of low curvature as to avoid accelerations at high speeds uncomfortable to passengers.

Figure 3:
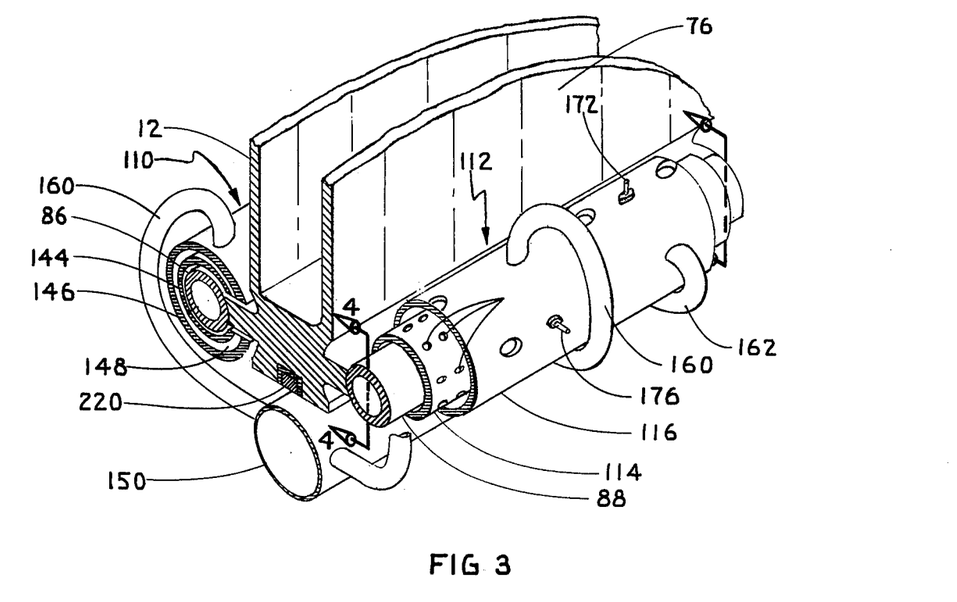
FIG. 3 is an enlarged and fragmentary isometric view, partially in section, illustrative of a portion of complementary air bearings and their relationship to a portion of the supporting guide means.
Figure 4:
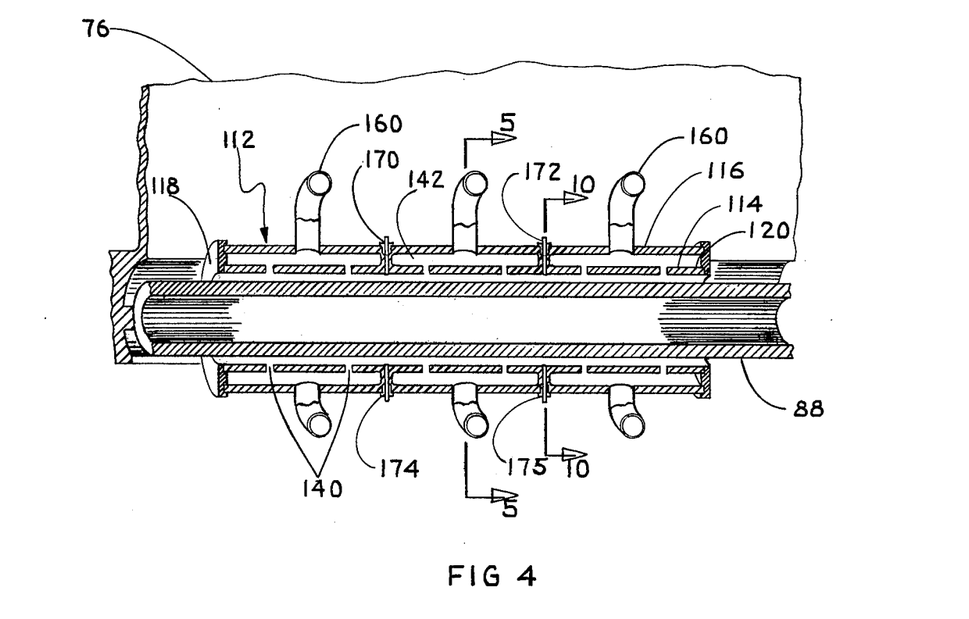
FIG. 4 is a vertical and longitudinal sectional view through one of the air bearings, such view being taken on the plane of the section line 4—4 in FIG. 3, with a fragmentary showing, partially in section, of adjacent portions of the supporting guide structure also being shown.
Figure 5:
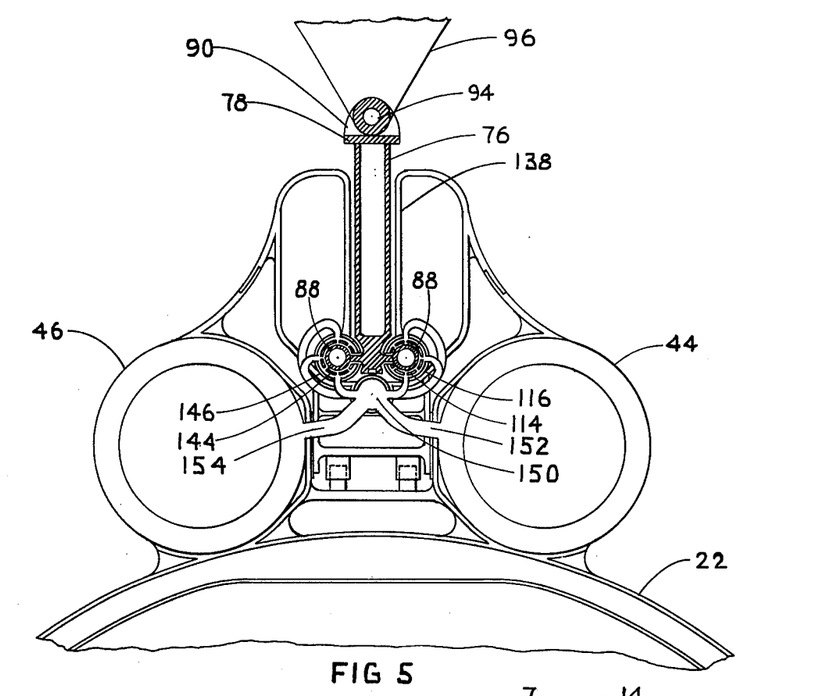
FIG. 5 is an enlarged fragmentary front view of the upper part of the vehicle and shows a portion of the pivotally mounted guide, with the latter being shown in transverse vertical section, and with the complementary air bearings being shown in vertical transverse section on a plane designated by the section line 5—5 in FIG. 4.

The forward and rear linear air bearings 62 and 64 of the means 60 are essentially identical to each other and a description of one will suffice for both. The linear bearing means 62 comprises, as best shown in FIGS. 3 and 4, a pair of complementary air bearings 110 and 112 which are symmetrical to each other with respect to the vertical medial plane of the guide means 12 as are the guide rails 86 and 88, and inasmuch as such bearings are mirror images of each other a detailed description of one will suffice for both. Accordingly, the linear air bearing 112 will be seen to comprise a pair of radially spaced concentric, generally C-shaped sleeves or substantially tubular members 114 and 116 aligned longitudinally extending slots. The members 114 and 116 are axially coextensive and the substantially annular or C-shaped spaces at the extremities thereof are closed and sealed by end walls 118 and 120 welded or otherwise connecting the sleeves 114 and 116.

Figure 8:
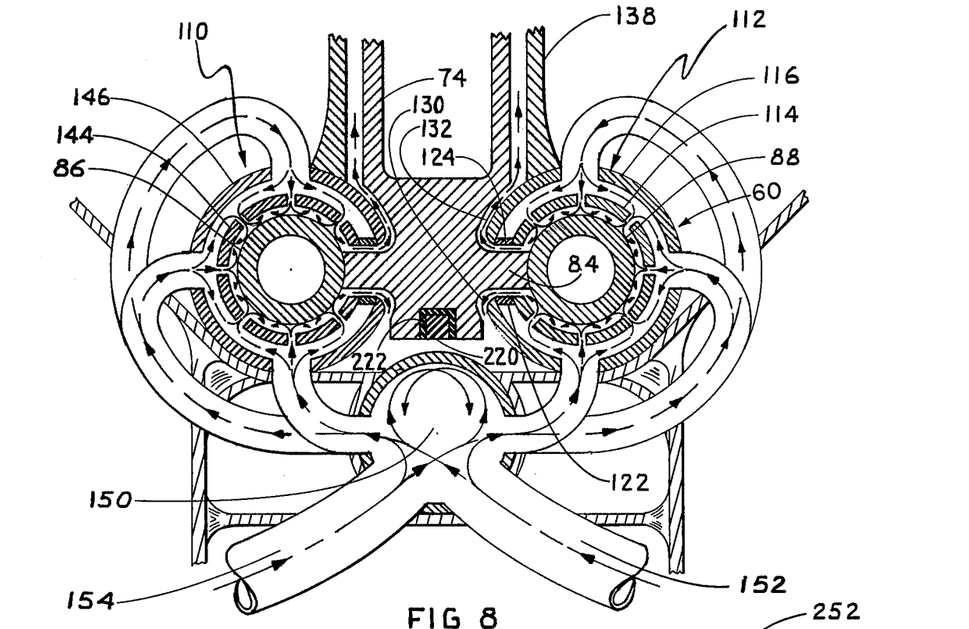
FIG. 8 is an enlarged fragmentary sectional detail view of coacting portions of the guide rail structure and the complementary air bearings, such view being taken upon the plane of the section line 5—5 of FIG. 4.

As will be appreciated on inspection of FIG. 8, the gaps between the members 114 and 116 along the edges of the slots therein are closed by walls 122 and 124 welded thereto and extending between the closure elements 118 and 120. Also, as plainly shown in FIG. 8, the concentric members 114 and 116 are also concentric with the tubular guide rail 88 and the closure walls 122 and 124 are spaced respectively below and above the flange or rib 84.

The web structure 80 is concaved as at 130 and 132 immediately below and above the rib 84 to conform to the shape of and to be in spaced proximity to the immediately adjacent external configuration of the outside air bearing sleeve 116. Tha air bearing 112 additionally includes a vertical wall 138 having its lower edge fixedly secured to the outer sleeve 116 to extend upwardly therefrom in closely spaced proximity to the plate 76 of the guide means 12, and the upper edge of such wall is disposed at a height spaced below the upper plate 78 of the guide means 12. In practice it is preferred that the wall 138 of the air bearing means 62 be generally coextensive with the means 60 and be common to both the air bearing means 62 and 64.

The upper edge of the wall 138 is structurally fixed to the frame (not shown) of the vehicle 20, and the upper edge thereof is smoothly faired to the external skin of the vehicle body 22 as shown.

The inner tubular member 114 is of perforate character as indicated at 140 whereby air introduced into the substantially annular space 142 between the sleeves is directed into the spaces between the inner sleeve 114 and the guide rail 88 and into the spaces between the web structure and the sleeve 116 and the wall 138. The air bearing 110 is a mirror image of the air bearing 112 and includes a perforate inner sleeve 144 and an outer sleeve 146 that correspond to the sleeves 114 and 116, respectively.

Means is provided to supply air under pressure to the space 142 and the corresponding space 148 of the air bearing 110, such means comprising a main air manifold 150 for supplying air to both the air bearing means 62 and 64, with such manifold 150 being coupled by ducts 152 and 154 to the air compressor sections, not shown, of the fan jet engines 44 and 46, respectively.

A plurality of distribution ducts such as those shown at 160 and 162 in FIGS. 3 and 4 supply air from the manifold 150 at spaced positions along the length of the sleeves 116 and 146 in an arrangement such as to promote a uniform distribution of air into the spaces 142 and 148.

The air bearing 112 also includes a longitudinally spaced pair of upper sensors 170 and 172 and a corresponding pair of longitudinally spaced lower sensors 174 and 175 is provided. In addition, a lateral sensor 176 is provided intermediate the longitudinally spaced pair of sensors. The air bearing 110 has corresponding sensors which are correspondingly numbered.

The sensors 170, 172, 174, 175 and 176 of the air bearings 110 and 112 are such as to sense and to produce signals that are a function of the proximity of the air bearings to the associated guide rails 86 and 88. Though such sensors can be of pneumatic character; it being noted that the pressure at the radially inward ends of the sensors or at the inner surface of the perforated bearing sleeve is a function of the bearing-rail spacing at such immediate location; it is preferred that the sensors be of a type productive of electric potentials or electrical signals that are functions of the proximity of the bearing to the guide rail at their particular locations. Inasmuch as the particular character of the sensors does not constitute in and of itself the subject matter of this invention and since a detailed description thereof would only serve to obscure the actual invention, a brief discussion thereof and their relationship to the automatic flight control system of the aerodynamic vehicle 20 will amply suffice for those having an acquaintance with the field of automatic controls.

Conveniently, the sensors 170, 172, 174, 175 and 176 are of the type sensitive to the proximity of one electrically conductive surface to another, such as the proximity of the inner surface of a bearing sleeve to the outer surface of its associated guide rail; it being noted that such parts are metallic. The sensors can therefore, for example, be such as to respond to variations in electrical capacitance between the spaced parts, or alternatively, the sensors can respond to or sense variations in magnetic reluctance or permeability of its surroundings, it being noted that for this purpose the air bearing and its associated guide rail can be made of a ferromagnetic material.

It will be intuitively evident (and quite correctly so) to the most uninitiated that sufficient information is contained in the total output of all the sensors of the air bearing means 62 and 64 to enable an intellect (in the present instant a computer) knowledgeable in the arts of interpreting the meaning of such information and of controlling an aerodynamic vehicle to track a designed course, which desired course in this instance is to cause the aerodynamic vehicle 20 to perform so as to maintain all the air bearings of the air bearing means 62 and 64 centered about their respective guide rails.

The particular form of system employed to interpret and to utilize the output of the sensors 170, 172, 174, 175 and 176 to control the flight of the vehicle 20 in the desired manner does not in and of itself constitute the subject matter of the instant invention. Suffice to say, the system can be such as shown diagrammatically in FIG. 10 and includes a flight control computer 180 connected to receive as its input the output of all the sensors of all the air bearings of the bearing means 62 and 64. The output of the computer 180 is fed to forward flap drives 182 having operative connections to individually drive through the agency of electric drive motors, not shown, the forward flaps 28 and 30 of the vehicle. The computer 180 has outputs to forward rudder drives 184 and 186 that have operative connections to the electrically driven forward and rear rudders 40 and 42, respectively. Yet another computer output is fed to aft flap drives 188 that is operatively connected individually to the electrically driven aft flaps (and if desired elevators) respectively on the left and right sides of the vehicle 20.

An insight into the basis upon which the computer 180 can interpret its input and make the control decisions embodied in its output can be obtained on noting that the sensors 170, 172, and 174 of the bearings 110 and 112 of the bearings 62 and 64 provide data as to vertical displacement of various positions along the length of the vehicle 20 and indicate such movements of either forward or rear flaps as might be necessary.

The sensors 176 of the bearings 110 and 112 of the bearing means 62 and 64 produce data as to lateral displacement at positions spaced along the length of the vehicle 20.

The air bearings 62 and 64 permit the vehicle 20 five degrees of freedom relative to the guide means or rails 86 and 88, and such are controlled in the following manner.

Comparison of the sensor 176 outputs of the bearing means 62 primarily determines the control of the forward rudder 40, and such sensors 176 of the rear bearing 64 determines the control of the rear rudder, whereby yaw is controlled. Roll or differential movement of right and left side flaps can be controlled by comparing the output of sensor 170 of the bearing 110 with the output of sensor 174 of bearing 112. Alternatively, comparison can be made of sensors 174 and 170 of bearings 110 and 112, respectively.

The pitch of the vehicle 20 entails control of the forward flaps by comparison of the outputs of the sensors 170 and 174 of the respective bearings 110 and 112 of the forward bearing means 62. Similar comparisons of the corresponding sensors of the rear bearing means 64 can control the aft flaps and elevators 35.

The control system employed can, for example, be similar to that set forth in relation to *Control Configured Aircraft* described in a published Boeing Company Report issued by the U.S. Air Force Flight Dynamics Laboratory as AFFDL-TR-74-92 Volume III. Copies of such report are conveniently available from Wright-Patterson Air Force Base, Ohio. Indeed, the apparatus disclosed in such report can be extensibely simplified and yet serve admirably the purposes of the present invention, as will be easily comprehended by those of modest familiarity with the automatic control art. A suitable flight control computer 180 for converting the sensor signal outputs to the necessary electrical actuator commands is an analog computer such as manufactured and sold by Electronic Associates, Inc.

It is to be understood that each of the vehicles 20, 48 50 and 52 includes automatic flight control systems as that above described, as well as the automatically controlled electric truck systems 66 and 68 now to be described.

Figure 9:
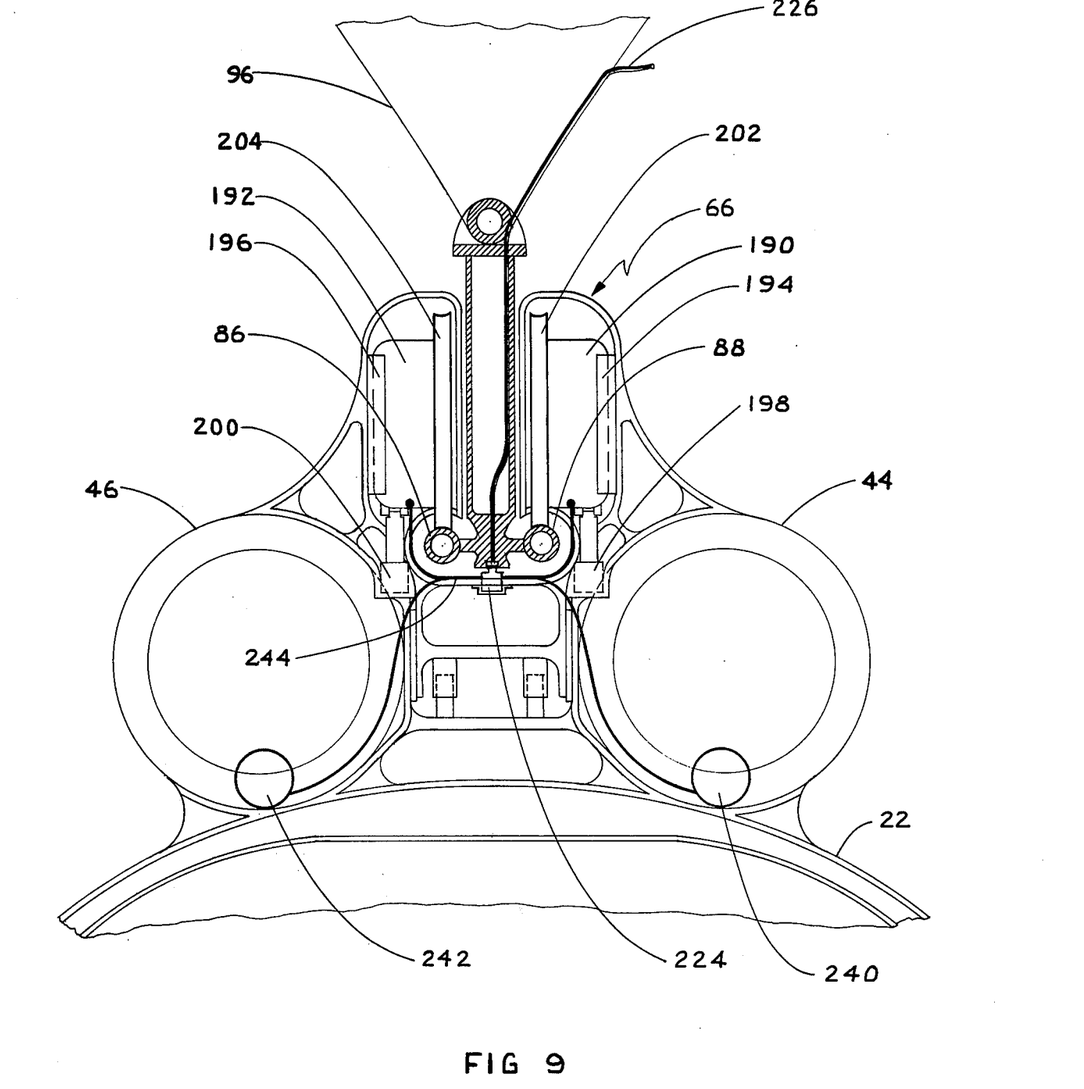
FIG. 9 is a front elevational view generally similar to FIG. 5, the same being partially in vertical section to show the relationship of the electric trucks to the guide rails, and being partially diagrammatic in the showing of part of the electrical system inclusive of the engine driven alternators, and the electrical power distribution system inclusive of the energized trolley strip, and the conections of the electric trucks to the alternators and the trolley strip; and, FIG. 10 is a diagrammatic view of the control systems for the electric trucks and the aerodynamic surfaces of the vehicle incorporating on reduced scale a side elevation of the vehicle and an enlarged section of the air bearing structure taken upon the plane of the section line 10—10 in FIG. 4.

Since the electric truck systems 66 and 68 are essentially identical, a detailed description of one should suffice for both, and for this purpose attention is directed principally to FIGS. 9 and 10. The truck 66 comprises left and right electric drive units or motors 190 and 192 mounted for vertical movement in vertical guide means 194 and 196, respectively. Means 198 and 200 are provided for respectively controlling the vertical position of the motors 190 and 192. The means 198 and 200 are preferably electrically actuatable and reversibly drive vertical drive screws having operative connection to the respective motors 190 and 194.

In their lowered and illustrated positions the motors have their output wheels 202 of concave periphery in contact with the top of the guide rails 88 and 86 respectively when the latter are centered in the air bearing means 62 and 64. In their raised positions, the wheels are disposed such as to permit the rails 86 and 88 to very closely approach, but not to actually contact, the air bearings 110 and 112. To the extent the vehicle is not buoyant or aerodynamically self-supporting by wing lift as augmented by ground effect, it should be evident that the vehicle 20 rests via the wheels 204 and 206 on the rails 86 and 88.

Electrical energy to supply the electrical equipment of the vehicle 20 is supplied to an electrical conductor strip or trolley wire 220 embedded in the underside of the web 80 of the guide means 12, the same being insulated therefrom by an insulator 222, and electric pickups or contactor means carried by the vehicle 20 such as the means 224 electrically engage the electrically energized or "hot" conductor 220 and the grounded web 80. The guide means 12 constitutes the equivalent of the ground rails of the electric street trolleys and the strip 220 serves as the trolley wire of such old transportation systems. Direct current is the preferred form of electric power supplied to the strip 220 by way of spaced supply conductors 226 of sufficient flexibility to tolerate the swinging of the guide means 12. Slidably expansible means 230 couple the strips of adjoining rail sections at expansion joints.

The vehicle 20 will conventionally include electric power generation and storage facilities to augment or supplant the power delivered by the trolley strip 220. Such facilities include electric storage batteries, not shown, as well as alternators (with rectified voltage output) 240 and 242 driven by and being part of accessory equipment of the fan jet engines 44 and 46.

The rectified outputs of the alternators 240 and 242 are connected along with the contactor means 224 to an electric harness means 244 that is coupled to the motors 190 and 192.

The motors 190 and 192, which are preferably series wound, are provided with conventional switch and rheostat control means for being driven forwardly and in reverse, whereby the vehicle 20 can be driven forwardly and backed up.

The control means for the motors 190 and 192 can include means to effect braking thereby, with the output rheostats the motors (acting as generators) being controllably consumed by rehostats or high wattage resistors, not shown.

Means is provided and incorporated in a truck controller 252 to cause the motors to be lowered to place the wheels in traction contact with the guide rails 86 and 88 whenever the motors are energized or placed in braking mode for reasons immediately to be comprehended.

The truck controller 252 is also such as to raise the motors 190 and 192 to their raised positions when and only when the vehicle 20 has a predetermined minimum flying speed. To accomplish the latter function, the truck controller 252 (which is common to all the motors of the trucks 66 and 68) is connected to a Pitot tube or air speed sensor 250 mounted externally on the forward end of the vehicle for operative control thereby.

While each vehicle 20, 48, 50 and 52 has its own truck controller 252 and speed sensor 250, it will be readily perceived that all the electric trucks have a common control insofar as their driving and braking functions are concerned.

As thus far described, it will be seen that after loading with passengers or cargo by special terminal facilities, not shown, all the electric trucks of the entire train are energized to propel the train forward with as much acceleration as permissible or possible. Such acceleration may be assisted by the fan jet engines if permissible, however, the fan jets need not be started until needed and possibly at a position quite remote from the loading terminal. Assuming the fan jets operating, the electric trucks will be raised relative to the vehicles as soon as the latter have attained flying speed, say 75 to 80 knots for example, whereupon the automatic flight control systems will be compelled to compel the vehicles to aerodynamically center the guide rails in the air bearings, whereby drag by the trucks is avoided, and as stated, the vehicles are automatically controlled with exquisite sensitivity to precisely track the guide means 12.

Whenever flying speed is lost or the pilot attempts to drive or brake the truck motors, the latter are automatically lowered, though they can support the vehicles when they are in raised position.

The fan jets include conventional dynamic or thrust reversing braking means, whereby the vehicles can approach to very near a congested area before reducing speed and utilizing solely quiet electric power with jet engines idling or off.

The swingable guide means 12 allows the same to be in proper relationship with the air bearings 62 and 64 and/or the electric trucks at all times to accommodate such banking of the vehicles as may be necessary along curves in the routes of the transportation system, or as may be necessitated to accommodate varying vehicle attitudes as such aerodynamic vehicles maneuver to track aerodynamically the guide means 12.

Figure 1:
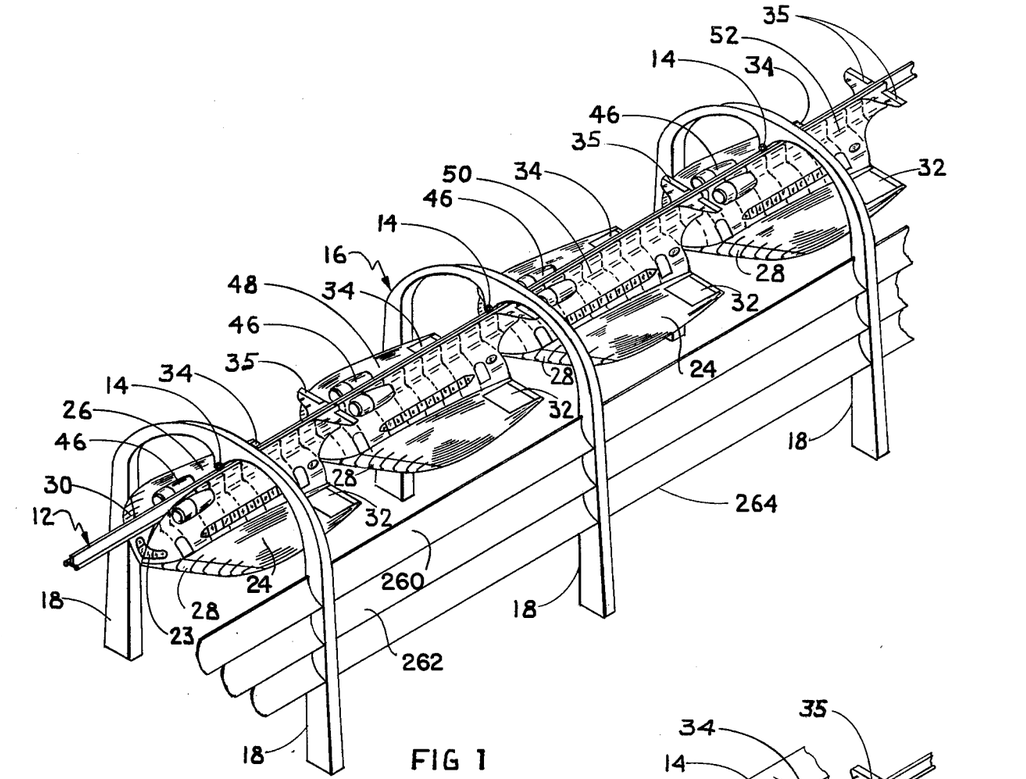
FIG. 1 is an isometric view of a train of coupled aerodynamic vehicles operatively associated with a broken overhead guide and support construction that includes gust spoilers.

In order to minimize the effects of lateral wind gusts, one or preferably both sides of the path of the vehicles are provided with gust spoilers in the form of vertically spaced and inclined deflector vanes 260, 262 and 264 mounted to extend intermediate adjacent tower legs 18 on the opposite sides of the tower arches 16. The gust spoilers are somewhat similar to the jet fences used in conjunction with jet engine test facilities and on the decks of aircraft carriers. The vanes serve to vertically deflect and disrupt wind gusting thereagainst, and serve beneficially also to vertically deflect sound waves propagated thereagainst so as to substantially reduce horizontal sound propagation therethrough and therefore serve as a noise abatement feature. In the preferred construction, the sides of the vanes 260, 262 and 264 nearest the guide means 12 are surfaced with a sound absorbing material such as foamed synthetic resin of an intermediate degree of elasticity.

Figure 2:
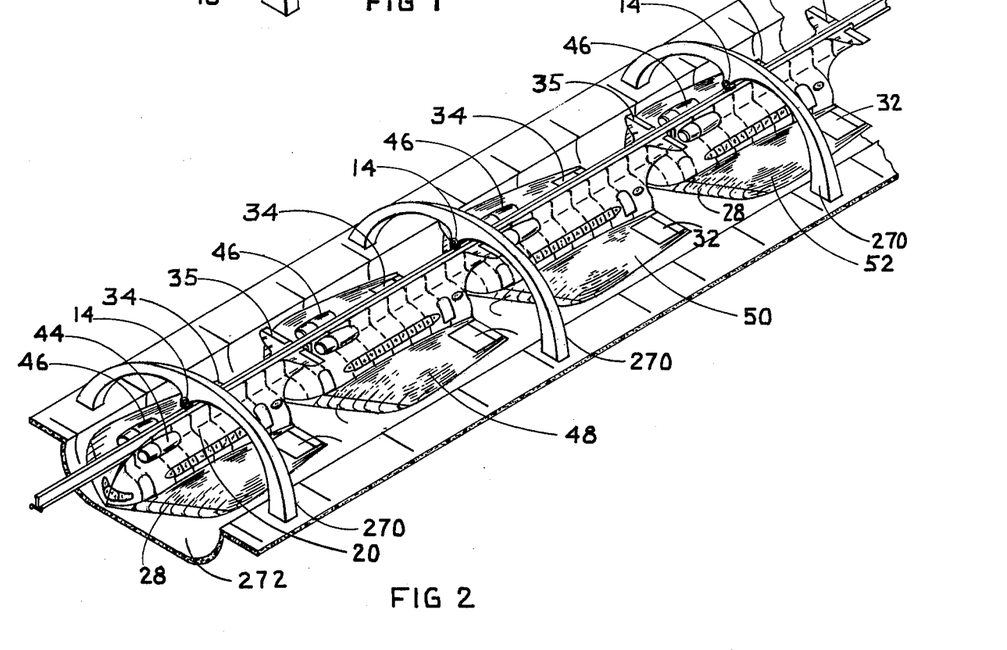
FIG. 2 illustrates a train of vehicles such as shown in FIG. 1 in association with a modified guide and support system that overlies a ground effect bed that is recessed and which does not include gust spoilers.

The alternative form of the invention shown in FIG. 2 differs from that described above in only the following stated particulars. The supporting towers utilize lower arched support towers 270 and overlie a recessed or depressed ground effect bed 272. The towers 270 are not provided with gust spoilers for the reason that the lower guide rail and the recessed ground effect bed 272 dispose the vehicles 20, 48, 50 and 52 at a sufficiently low level as to be less subject to lateral wind gusts and also such that noise generated thereby is directed (and reflected by the contoured ground bed 272) more in an upward and less objectionable direction.

The ground effect bed is contoured so as to enable the vehicles to bank at least about 30° either side of horizontal. The bed can be formed of concrete resting on a ground surface appropriately graded or contoured as a preliminary to the pouring of the concrete.

The present invention extends to support for the guide means 12 equipped with a ground effect bed means and/or gust spoilers through tunnels, over canyons and streams, and across bodies of water. Also provision is made for eliminating or preventing ice on the guide means 12; however, such supplemental provisions and improvements are to be covered in other applications.

Except as has been mentioned, the materials employed in any and all parts of the system 10 are believed to be matters of choice well within the scope of ordinary engineering skills. For example, the materials of the vehicles are preferably such as would normally be indicated in the fabrication of conventional aircraft.

Attention is now directed to the appended claims for an appreciation of the actual scope of the invention.

We claim:

1. A transportation system comprising an elongated guide means, an aerodynamically dirigible winged aircraft that becomes fully aerodynamically airborne in free ambient air and which is aerodynamically controlled by guidance means in free flight in ambient air to fly along a path defined by the longitudinal extent of the guide means, said guidance means operatively coupling the aircraft to the guide means for causing the aircraft to sense its relative distance from the guide means and to control its flight so that it travels along said path that includes support means carried by the aircraft in engagement with the guide means to support the aircraft from the latter, means carried by the aircraft for moving the support means from supportive engagement with the guide means when the aircraft is in controlled flight, whereby the guide means is subjected to forces applied thereto by the aircraft and the guidance means that the relatively small compared to the net forces aerodynamically experienced by the aircraft normal to said path, when the aircraft is in controlled flight along said path with the support means removed from said supportive engagement with the guide means.

2. The combination of claim 1, including said aircraft having means for sensing external environmental conditions known to be sufficient to sustain the aircraft in aerodynamic flight, and means for causing operation of said means for moving the support means from said supportive engagement upon sensing such environmental conditions.

3. The combination of claim 2, wherein said sensing means is such as to sense the velocity of ambient air relative to the aircraft.

4. The combination of claim 1, wherein the guidance means includes a control system which is inclusive of sensors operatively interconnected between the aircraft and the guide means for controlling the flight characteristics of the aerodynamically dirigible aircraft to minimize forces normal to the path of the aircraft between the latter and the guide means.

5. The combination of claim 4, including said aircraft having means for sensing external environmental conditions known to be sufficient to sustain the aircraft in aerodynamic flight, and means for causing operation of said means for moving the support means from said supportive engagement upon sensing such environmental conditions.

6. The combination of claim 5, wherein said sensing means is such as to sense the velocity of ambient air relative to the aircraft.

7. The combination of claim 1, wherein the support means is an electrically powered truck.

8. The combination of claim 1, wherein the guidance means operatively coupling the aircraft to the guide means includes air bearing means fixed to the aircraft that partially embraces the guide means, said air bearing means being free to move to a limited extent in all directions normal to the longitudinal extent of the of the embraced portion of the guide means from a centered relation, with said support means, when in said supportive engagement with the guide means, being disposed to engage the guide means when the latter is in centered relation relative to the air bearing, whereby downward movement of the air bearing relative to the guide means can be prevented and the centered relation of the air bearing about the guide means can be maintained when the aircraft is not airborne.

9. The combination of claim 1, wherein said guide means comprises a plurality of elongated rail sections in end to end relation, expansion joint means joining adjacent rail sections to limit tensile and compressive forces therebetween.

10. The combination of claim 1, including gust spoiling means extending along the guide means and spaced laterally from the aircraft for disrupting lateral wind gusts, whereby movement of the aircraft receives minimal disturbance from lateral wind gusts.

11. The combination of claim 10, wherein the gust spoiling means comprise vertically inclined and spaced vanes arranged to deflect vertically both horizontal air movement and horizontal sound propagation.

12. The combination of claim 1, including a ground effect bed extending along and underlying the guide means, said ground effect bed being transversely contoured in relation to the position and spacing of the guide means thereabove and to the transverse configuration of the aircraft to enable free rolling movement of the aircraft about an axis parallel to the guide means of at least 20°.

13. The combination of claim 1, wherein said aircraft is disposed exteriorly of and below the guide means in substantially free ambient air.

14. A transportation system comprising an elongated guide means, an aerodynamically dirigible winged aircraft that is capable of becoming fully aerodynamically airborne in free ambient air, means coupling the aircraft to the guide means for guidance thereby that includes means carried by the aircraft in engagement with the guide means to support the aircraft from the latter, means carried by the aircraft for moving the support means from supportive engagement with the guide means, whereby energy losses by friction resulting from supportive engagement are reduced, said guide means comprising a plurality of elongated rail sections in end to end relation, expansion joint means joining adjacent rail sections to limit tensile and compressive forces therebetween, said guide means including spaced elevated supports dependingly and pivotally supporting the joined rail sections for lateral swinging movement.

15. An air bearing construction comprising an elongated supporting guide comprised of a pair of elongated parallel and spaced generally cylindrical guide rails joined by a supporting web extending horizontally therebetween, with the junctures of the web therewith subtending angles from the respective centers of such rails less than about 45° above and below the horizontal, a pair of air bearings each comprising a pair of elongated coaxially spaced, inner and outer tubular members, said tubular members having lateral slots extending the entire lengths thereof, said tubular members receiving in coaxially spaced relation therein one of the rails, with the web extending radially through the slots in spaced relation to the tubular members, means sealing the entire periphery of the outer tubular member to the entire periphery of the inner tubular member to confine the space between the tubular members, means for introducing air into the confined space through the outer tubular member, said inner tubular member having spaced perforations therethrough to direct air radially inward from each perforation directly toward the axis of the tubular members, and means connecting the air bearings for maintaining them in fixed spatial relation to each other.

16. The combination of claim 15, including sensing means extending through the tubular members for sensing the proximity of the rail to a plurality of spaced locations about the interior of the inner tubular member, whereby the application of external forcess to the air bearing to maintain coaxial relationships relative to the rails can be controlled.

17. The combination of claim 15, including a vertical support wall secured to and extending above the web, with said outer tubular members having upstanding air bearing walls fixed thereto that are on opposite sides of and closely spaced to the vertical support wall, said walls being so constructed and arranged that air passing from within the inner tubular members above the web passes upwardly between the bearing walls and the support wall to constitute an air bearing therebetween.

18. The combination of claim 15, including means pivotally supporting the web at spaced positions along its length for lateral swinging movement about an axis thereabove.

19. The combination of claim 18, wherein the elongated guide is comprised of a plurality of elongated sections disposed in aligned and spaced end to end relationship, and expansion joint means maintaining adjoining sections in alignment while limiting compressive and tensile forces therebetween.

20. A high-speed transportation system comprising an elongated guide means, a self-propelled aerodynamically dirigible aircraft disposed exteriorly of, below and operatively connected by means carried at the top of the aircraft to the guide means to travel a path guided by the guide means, means for directably controlling the aircraft to travel said path including sensing means carried by the aircraft in operative association with the guide means to sense displacement from the latter with the means for controlling the aircraft operating to maintain the displacement at a set value and means pivotally supporting the guide means at spaced positions for lateral swinging movement.

21. The combination of claim 20, wherein said aircraft is coupled to the guide means by an air bearing means for minimizing friction therebetween.

22. The combination of claim 21, including gust spoiling means extending along the path of the aircraft for minimizing ill effects of lateral wind gusts.

23. The combination of claim 21, including a ground effect bed means underlying the path of the aircraft for stabilizing and contributing to the aerodynamic lift of the aircraft, said bed having a transverse contour conformable to movement of the vehicle about its roll axis of at least 20° to both sides as well as to swinging movement of the guide means.

24. The combination of an elongated guide means defining an elongated path free of abrupt turns and a self propelled and dirigible aircraft disposed externally of the guide means, said aircraft having controlled aerodynamic means that reacts with ambient atmosphere to travel said path, and control means for controlling the aerodynamic means to cause the aircraft to travel said path without subjecting the guide means to any forces normal to the extent of the latter as large as the forces necessarily applied aerodynamically to the aircraft normal to said path to maintain the aircraft on said path, with said control means including sensing means carried by the aircraft for sensing the proximity of the guide means to such sensing means, with the control means operating to maintain the sensed proximity substantially constant.

25. The combination of claim 24, wherein the sensing means is spaced from the guide means with at least free running clearance therebetween.

26. The combination of claim 24, wherein the controlled aerodynamic means controls the roll, pitch, and yaw as well as the lift and lateral thrust forces applied to the aircraft.

27. The combination of claim 24, wherein the sensing means includes horizontal and vertical sets of sensors that are spaced longitudinally relative to the aircraft, and wherein the controllable aerodynamic means operates to cause the aircraft to travel said path in a fashion such that a line defined by the spaced sets of sensors is maintained tangential to the path.

28. The combination of claim 27, wherein said sensing means includes a set of proximity sensors at each of said spaced portions of the aircraft.

* * * * *